United States Patent
Pitard et al.

(10) Patent No.: US 9,096,328 B2
(45) Date of Patent: Aug. 4, 2015

(54) METHOD AND DEVICE FOR AUTOMATICALLY ESTIMATING A DEGRADATION IN FUEL CONSUMPTION AND IN DRAG OF AN AIRCRAFT

(71) Applicant: Airbus Operations (SAS), Toulouse (FR)

(72) Inventors: Fabien Pitard, Toulouse (FR); Yann Cros, Toulouse (FR); Serge Laporte, Aurade (FR); Jean-Pierre Demortier, Maurens (FR); Mauro Marinelli, Toulouse (FR); Sandrine-Mahile Leotin, Tournefeuille (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 153 days.

(21) Appl. No.: 13/904,661

(22) Filed: May 29, 2013

(65) Prior Publication Data
US 2013/0325219 A1 Dec. 5, 2013

(30) Foreign Application Priority Data

Jun. 5, 2012 (FR) ..................................... 12 55221

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *B64D 45/00* | (2006.01) | |
| *G07C 5/08* | (2006.01) | |

(52) U.S. Cl.
CPC .............. *B64D 45/00* (2013.01); *G07C 5/0825* (2013.01)

(58) Field of Classification Search
CPC .............................. B64D 45/00; G07C 5/0825
USPC ........................................................... 701/14
See application file for complete search history.

(56) References Cited

U.S. PATENT DOCUMENTS

| | | |
|---|---|---|
| 6,345,232 B1 * | 2/2002 | Lynch et al. .................. 701/479 |
| 2005/0288895 A1 | 12/2005 | Petit |
| 2007/0271037 A1 | 11/2007 | Overstreet et al. |
| 2010/0280730 A1 | 11/2010 | Page et al. |
| 2010/0332053 A1 | 12/2010 | Brotherton |
| 2011/0282524 A1 * | 11/2011 | Mutuel et al. ................... 701/14 |

FOREIGN PATENT DOCUMENTS

| | | |
|---|---|---|
| EP | 1612140 | 1/2006 |
| EP | 2270618 | 1/2011 |

OTHER PUBLICATIONS

French Search Report, Feb. 7, 2013.

* cited by examiner

*Primary Examiner* — Calvin Cheung
*Assistant Examiner* — Paula L Schneider
(74) *Attorney, Agent, or Firm* — Greer, Burns & Crain, Ltd.

(57) ABSTRACT

A method and device for automatically estimating a degradation in fuel consumption and in drag of an aircraft. The device comprises a device for calculating a numerical value of the effect of a degradation in performance on the fuel consumption and/or the drag of the aircraft, and an arrangement for displaying this numerical value on a screen in the cockpit of the aircraft.

13 Claims, 1 Drawing Sheet

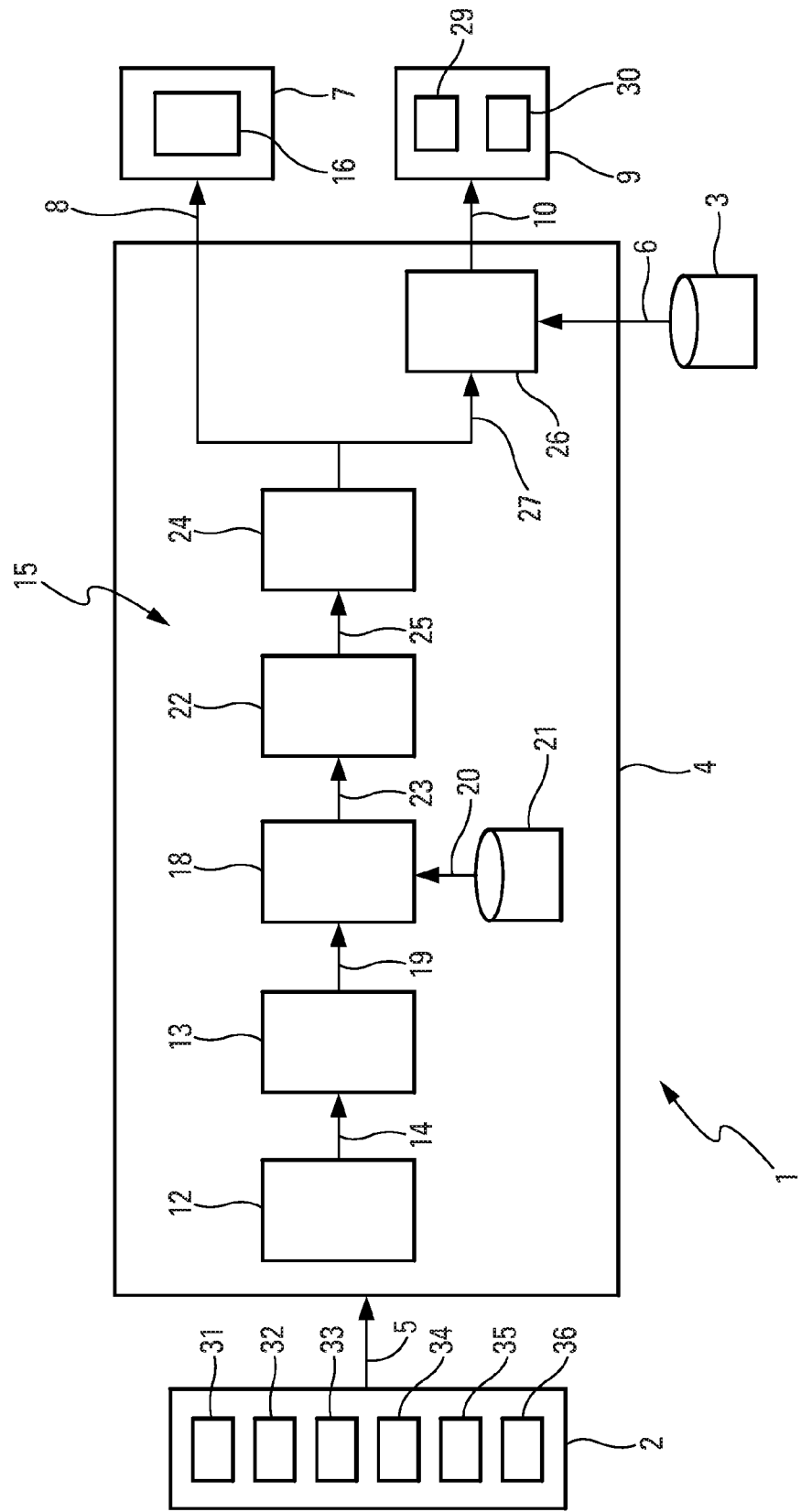

METHOD AND DEVICE FOR AUTOMATICALLY ESTIMATING A DEGRADATION IN FUEL CONSUMPTION AND IN DRAG OF AN AIRCRAFT

CROSS-REFERENCES TO RELATED APPLICATIONS

This application claims the benefit of the French patent application No. 1255221 filed on Jun. 5, 2012, the entire disclosures of which are incorporated herein by way of reference.

BACKGROUND OF THE INVENTION

The present invention relates to a method and a device for automatically estimating in real time a degradation in performance of an aircraft that can lead to negative effects on the fuel consumption and the drag of the aircraft.

More precisely, the object of the present invention is to provide a pilot of the aircraft with a numerical value of the effect of the degradation of said aircraft on the fuel consumption and/or the drag, combined with a warning when the degradation in fuel consumption and/or in drag is judged to be too high with respect to the type of mission to be accomplished.

It is known that many functions onboard an aircraft, in particular a cargo plane, use performance data. These functions notably relate to the guidance of the aircraft over a vertical flight path, or else the calculation of the predictions on consumption of fuel at the destination.

The performance calculations carried out by these functions use reference performance models. These models are formed from databases and from simplified equations of the mechanics of the flight. The databases relate to a standard aircraft, being representative of an average level of performance. The nominal fuel consumption and drag of an aircraft may be deduced from these models.

Thus, when the aircraft exhibits a degraded aerodynamic behavior or engine efficiency, the calculation of the flight path or of the fuel consumption may be optimistic and may no longer correspond to that of the real aircraft.

Accordingly, with the aim of re-adjusting the model used, correction factors from the performance of each aircraft type may be applied during the flight, such as for example penalties on the fuel consumption or on the drag. The operational procedures provided advises pilots against modifying these correction factors during the flight, except in cases for which the cause of a degradation is well identified. Moreover, the correction factors provided to the pilots are, in general, over-estimated in order to take into account the worst case scenario. Two types of possible corrections exist:

- corrections which allow the aging of the aircraft to be taken into account. These factors are determined by the airline thanks to a monitoring of the fleet carried out by means of tools that the aircraft manufacturer makes available. These factors can never be modified by the pilot in flight. They are automatically loaded onto the aircraft by the airline or by an intervention of the maintenance crews; and
- corrections associated with a given flight. These corrections are inserted by the pilots and are those which are considered by the present device.

Aside from a manual monitoring of the fuel consumption, the pilots do not possess any automatic means that can assist them in estimating the impact on the performance in real time of a degradation that occurred during the flight. This manual monitoring allows the identification of the importance of the degradation after a time depending on the flightplan, but which remains in any case of the order of several tens of minutes, generally around thirty minutes.

Thus, as regards the fuel consumption:
- the fuel predictions along the flightplan consider the aircraft to be in a state comparable to that which it was in at the start of the flight, in other words virtually nominal; and
- the means for monitoring the correct level of fuel consumption during the flight are essentially manual.

It is known that a significant degradation in the current state of the aircraft can have very significant impacts on its flight. Several cases are possible, and notably:

A/ during a civilian mission, the pilot becomes aware of a degradation of the current state of the aircraft. The real degradation from the fault is, in general, over-estimated by the means available to the pilot, which may lead to a diversion. This situation is of no consequence for safety, but involves high costs for the airline;

B/ during a civilian mission, the pilot becomes aware very late of a degradation of the current state of the aircraft;

C/ during a mission following a pre-calculated flight path, a degradation occurs. The pilot becomes aware of a degradation when the latter generates an effect to which it is sensitive, such as for example a decrease in the margin with respect to the stall or a reduction in its climbing capacities. Certain types of degradation take effect in a gradual manner, when the aircraft is still far from its limits. If the automatic pilot system is active, the pilot does not necessarily notice a change in the behavior of the aircraft. He will have to wait until the maximum performance is requested in order to become aware that the aircraft is degraded; and D/ during a civilian mission, the cruising phase may be reduced to a minimum. Over the majority of the flight, the aircraft will be climbing or descending, will undergo modifications in true airspeed, will engage turns in order to follow its route and will be subjected to the atmospheric conditions. There is a risk of never (or very rarely) encountering stable conditions, which will accordingly delay the information on the situation to the pilot.

SUMMARY OF THE INVENTION

The object of the present invention is to help the crew in particular in such situations. It relates to a method for estimating, automatically, in real time and in a precise manner, a degradation in performance of an aircraft, in particular of a cargo plane, which can lead to negative effects on the performance in terms of fuel consumption and/or drag of the aircraft.

For this purpose, according to the invention, said method is noteworthy in that, on the aircraft during a flight, the following sequence of steps is carried out in an automatic and repetitive manner:

a) the acquisition is carried out in real time of data comprising at least air and inertial data and satellite positioning data;

b) the re-adjustment of the air and inertial data is carried out with the aid of said satellite positioning data;

c) at least one numerical value is calculated of the effect of a degradation in performance on one parameter of the aircraft, by comparing the current state of this parameter, which is calculated starting from said re-adjusted air and inertial data with the aid of at least one performance model, with a theoretical state of said parameter; and d) this numerical value thus calculated of the effect of a degradation in performance on said parameter is displayed on at least one screen in the cockpit of the aircraft.

According to the invention, the following are calculated:

a numerical value of the effect of a degradation in performance on the fuel consumption of the aircraft or on the drag of the aircraft (allowing information on the flight path to be deduced); or else two numerical values of the effect of a degradation respectively on the fuel consumption and the drag.

Thus, the invention allows a numerical value of the effect of a degradation in performance on at least one parameter of the aircraft, namely on the fuel consumption and/or the drag, to be estimated and to be supplied. Such a numerical value is an explicit and precise indication of the effect of the degradation, compared for example with a simple indication of threshold crossing. Preferably, a numerical value is expressed in percentage and represents the degradation in percentage with respect to a theoretical value, for example a percentage of the expected consumption of fuel. In this case, this precise value allows the pilot to re-calculate the fuel predictions up to the destination to the nearest few percent.

In addition, owing to the re-adjustment of the air and inertial data performed in the step b), very precise air and inertial data are supplied to the performance model, which allows a numerical value, which is also very precise, to be obtained at the step c). Advantageously, the re-adjustment is made by calculating a bias of the air and inertial data representing a total slope bias and by correcting, with the aid of this bias, the air and inertial data used at the step c).

Thus, thanks to this very precise numerical value of the effect of a degradation in performance of the aircraft on the fuel consumption and/or the drag, which is presented to the pilot on a display, the aforementioned drawbacks can be overcome, as described hereinbelow.

Furthermore, advantageously, at an intermediate step between the steps c) and d), it is verified, according to the attitude parameters of the aircraft, whether the numerical value calculated at the step c) is valid or not, and if it is not valid, it is fixed at the last numerical value considered as valid.

In addition, advantageously, at an intermediate step between the steps c) and d), the difference between the current numerical value and the value currently displayed on said screen is calculated, and this difference is compared with a first predetermined threshold. In this case, at the step d), as value which is displayed on the screen, said value currently displayed is replaced by said current numerical value, if said difference exceeds said first threshold.

Furthermore, advantageously, at a step after the step c), the difference between the current numerical value and a value available in a flight management system is calculated, and this difference is compared with a second predetermined threshold. In this case, a warning is generated if the difference between these two values exceeds said second threshold. Preferably, said warning comprises at least one of the following signals:

an audible signal; and a visual signal.

Furthermore, advantageously:

at a step after the step c), said numerical value calculated at the step c) is transmitted to at least one system on the aircraft; and/or at the step a), said data comprising at least air and inertial data and satellite positioning data are determined.

The present invention notably allows:

a precise estimation of the degradation of the aircraft in terms of over-consumption of fuel to be provided to the pilot or to systems of the aircraft. An estimation in real time of the degradation of the aircraft notably allows the number of cases where diversions are carried out without there being any risk to the mission to be limited;

the crew to be warned when the degradation is significant and risks the aircraft running out of fuel;

the pilot to be warned when the flight path can no longer be adhered to because of the degradation; and an early warning to be made available, even under dynamic flight conditions (turns, climbs, descents, wind gusting).

The preceding features respectively allow the aforementioned situations A/, B/, C/ and D/ to be overcome.

The present invention also relates to a device for estimating a degradation in performance of an aircraft.

According to the invention, said device is noteworthy in that it comprises:

first means for performing the acquisition, in real time, of data comprising at least air and inertial data and satellite positioning data;

second means for performing the re-adjustment of the air and inertial data with the aid of said satellite positioning data;

third means for calculating at least one numerical value of the effect of a degradation in performance on at least one parameter of the aircraft, by comparing the current state of this parameter, which is calculated starting from said re-adjusted air and inertial data with the aid of at least one performance model, with a theoretical state of said parameter; and display means for displaying, on at least one screen in the cockpit of the aircraft, this calculated numerical value of the effect of a degradation in performance on said parameter. Preferably, the value is only displayed if it exceeds a certain threshold which is linked to the precision of the function.

Furthermore, advantageously, said device additionally comprises:

means for verifying the validity of a calculated numerical value; and/or means for generating a warning if the difference between the current numerical value and a value available in a flight management system exceeds a predetermined threshold; and/or means for determining said data comprising at least air and inertial data and satellite positioning data.

Furthermore, advantageously, said display means are formed in such a manner as to replace, on said screen, the value currently displayed by the current numerical value, if the difference between these values exceeds a predetermined threshold.

The present invention exhibits, notably, the following features:

automatic calculation of the degradation of the aircraft, not only in terms of drag, but also in terms of fuel consumption;

operation in real time, by directly using the data generated by processors on the aircraft, which provides a high speed of calculation and a high reactivity for detection of a degradation (not much filtering needed);

precision of the results. The invention comprises a correction of the total slope bias of the values measured by the incidence and inertial probes, thanks to a comparison with satellite positioning data. This correction allows a numerical value for the degradation to be supplied with a bias attenuated with respect to that which may characterize, in certain cases, the incidence and inertial probes;

robust in a dynamic flight phase, because the invention operates even in dynamic flight conditions, in other words in a turn, climb, descent, acceleration, etc., while remaining within the envelope of nominal flight of the aircraft, which is adapted to the types of missions that the aircraft can accomplish;

warning for the crew, not only in the case of too high a drag, but also in the case of too high an over-consumption of fuel; and calculation of performance parameters, while supplying the crew with a numerical level of the observed degradation, which is also usable by other systems for re-adjusting calculated quantities representative of the performance of the aircraft (for example a calculation of a prediction in a flight management system, or of a flight path for avoiding terrain).

BRIEF DESCRIPTION OF THE DRAWINGS

The single FIGURE of the appended drawing will allow it to be well understood how the invention can be implemented. This single FIGURE is the schematic block diagram of a device according to the invention.

DETAILED DESCRIPTION OF THE PREFERRED EMBODIMENTS

The device 1 according to the invention and shown schematically in the FIGURE is designed to estimate, automatically and in real time, a degradation in performance of an aircraft (not shown), in particular of a cargo plane, that can lead to negative effects on the fuel consumption and/or the drag of the aircraft.

For this purpose, said device 1 which is onboard the aircraft, comprises:

an assembly 2 of usual sources of information, capable of supplying the values of parameters of the aircraft, listed hereinbelow;

a flight management system 3 or FMS;

a central processing unit 4 which is respectively connected by means of links 5 and 6 to said assembly 2 and to said flight management system 3 and which comprises means mentioned hereinbelow, which are capable notably of estimating a numerical value of at least one degradation in performance of said aircraft;

display means 7 which are connected by means of a link 8 to said central processing unit 4; and warning means 9 which are connected by means of a link 10 to said central processing unit 4.

In addition, according to the invention, said central processing unit 4 comprises:

acquisition means 12 for performing the acquisition, in real time, of data comprising at least air and inertial data and satellite positioning data, which are received from the assembly 2 by means of the link 5;

re-adjustment means 13 which are connected by means of a link 14 to said means 12 and which are formed in such a manner as to perform the re-adjustment of the air and inertial data with the aid of said satellite positioning data; and calculation means 15 for calculating at least one numerical value of the effect of a degradation in performance on (at least) one parameter of the aircraft, by comparing the current state of this parameter, which is calculated starting from said air and inertial data (re-adjusted by the means 13) with the aid of at least one performance model, with a theoretical state of said parameter.

In addition, according to the invention, said display means 7 display, on at least one screen 16 in the cockpit, this numerical value of the effect of a degradation in performance on said parameter, which is calculated by said means 15.

Thus, the device 1 according to the invention is able to estimate and to supply a numerical value of the effect of a degradation in performance on at least one parameter of the aircraft, namely on the fuel consumption and/or the drag. Such a numerical value is an explicit and precise indication of the effect of the degradation, compared for example with a simple indication of threshold crossing.

The display means 7 carry out the display in real time of the degradations in fuel consumption, for example on a screen 16 of the ECAM type.

In one preferred embodiment, said numerical value is expressed as a percentage and represents the degradation in percentage with respect to a theoretical value, for example a percentage of the expected consumption of fuel. This precise value notably allows the pilot to recalculate the fuel predictions up to the destination to the nearest few percent.

In addition, owing to the re-adjustment of the air and inertial data, carried out by the means 13, the latter deliver very precise air and inertial data to the performance model, which allows a numerical value which is also very precise to be calculated.

More precisely:

said means 12 carry out the acquisition in real time and the verification of the availability of the measured parameters. These means 12 allow both all the information associated with the flights to be centralized and the availability of each of the sources to be verified. The availability of the sources conditions the mode of calculation of the means 13 for re-adjustment of the air and inertial data; and said means 13 perform the re-adjustment of the air and inertial data with the satellite positioning data, in order to eliminate the bias on these parameters (total slope) which lead to errors on the performance calculations. This re-adjustment is carried out both during stabilized phases and in dynamic phases of flight. However, when the attitude of the aircraft attains a given threshold value in terms of inclination, the value of the bias is fixed.

According to the invention, said means 15 comprise:

means 18 which are respectively connected by means of links 19 and 20 to said means 13 and to a database 21 (comprising aerodynamic data, engine data and geometrical data) and which are formed in such a manner as to perform the calculation of the degradation in terms of drag and of fuel consumption. These means 18 calculate the degradation of the aircraft in real time by comparing the current state of the aircraft with theoretical values;

means 22 which are connected by means of a link 23 to said means 18 and which are formed in such a manner as to perform a calculation of the validity of the degradation and a correction of the estimated degradation. These means 22 make a decision, according to the attitude parameters of the aircraft such as for example the inclination, whether the degradations calculated by the means 18 are valid or not. For this purpose, the conditions must be satisfied for a certain time. In the contrary case, the degradations are fixed at their last valid value; and means 24 which are connected by means of a link 25 to said means 22 and which are formed in such a manner as to perform the calculation of the value of the degradation to be displayed with a view to presenting it to the crew. When the difference between the value displayed and that calculated (and declared valid) exceeds a given threshold for a given period, a new value is displayed.

Said central processing unit 4 additionally comprises means 26 for carrying out the monitoring of the degradation. This monitoring consists in performing a test on the amplitude of the degradations. If this amplitude exceeds a given threshold for a given time, the means 26 activate the warning means 9.

Said means 9 comprise means 29 for displaying a warning message in the case of degradations that are too high (for example on a page of the ECAM type). The means 9 may also comprise means 30 for emitting an audible warning signal. The means 9 are therefore activated by the means 26, which triggers an audible alarm and/or the display of a dedicated warning message.

The numerical value calculated by the means 24 can also be transmitted to other systems (not shown) on the aircraft, notably for re-adjusting calculated quantities representative of the performance of the aircraft (for example a calculation of predictions in a flight management system, or of a flight path for avoiding terrain).

Hereinafter is described in more detail the processing operations implemented within the central processing unit 4.

As a first step, the means 12 of said central processing unit 4 collect all the parameters needed for the various calculations, from said assembly 2. A given flight parameter may be obtained from several sources. The availability of each of the sources is also verified.

Said assembly 2 notably comprises, as shown in FIG. 1:
a processor 31 for air data;
a processor 32 for inertial data;
an engine processor 33;
a processor 34 for GPS data;
a fuel level processor 35; and
a flight control processor 36.

Said means 12 collect at least the following parameters:
Vzpsi: vertical speed formed by the ith satellite positioning source GNSS (three sources available);
TASi: true airspeed ADC (consolidated);
γgrdpsi: ground slope formed by the ith source GNSS (three sources available);
γairi: air slope formed by the ith source (three sources available). The three sources are kept without consolidation. On the other hand, the validity is monitored;
α: angle of incidence given by the ADC (three sources);
βi: sideslip angle given by the ith source ADC (three sources available);
Nxcgi: acceleration along the x axis in the aircraft reference frame, supplied by the ith source IRS (three sources available);
Nycgi: acceleration along the y axis in the aircraft reference frame, supplied by the ith source IRS (three sources available);
Nzcgi: acceleration along the axis z in the aircraft reference frame, supplied by the ith source IRS (three sources available);
GW: mass of the aircraft; and
g0: gravitational constant.

By using these parameters and by combining the air, inertial and GNSS data, the means 13 calculate the bias on the angle of incidence. Correcting the angle of incidence involved in the performance equations, allows the best estimate to be made of the total slope and, consequently, of all the performance data and a precision over a large part of the flight to be ensured.

For this purpose, the following expressions are taken into account:

$$\Delta\gamma windi = \gamma grdpsi - a\sin(Vzpsi/\text{consolidated TAS});$$

$$\Delta\gamma windomoy = fcn(\Delta\gamma windi)$$

with i the number of the source and fcn a known function; and $$DAOAi = \gamma grdpsi\_\gamma airi\_\Delta\gamma windmoy,$$

in which:
Δγwindi: difference between the air slope and the ground slope for the ith source;
Δγwindmoy: mean difference between the air slope and the ground slope for all the sources; and
DAOAi: bias of the angle of the incidence of the ith source.

This calculation is performed both in a phase of stable flight and in a dynamic flight phase.

However, in a dynamic flight phase, the bias is only calculated in a certain domain for example a Mach, an inclination or a slope domain. Outside of this domain, the bias is fixed at its last valid value.

Once the bias has been calculated, the means 18 correct and calculate various parameters of flight mechanics, prior to calculating the degradation in terms of drag and of fuel consumption, by means of the following expressions:

$$\alpha i = \alpha + DAOAi;$$

$$Nxaeroi = Nxcgi*\cos^{\alpha i}*\cos^{\beta i} - Nycgi*\sin^{\beta i} - Nzcgi*\sin^{\alpha i}*\cos^{\beta i}$$

$$Nzaeroi = Nxcgi*\sin^{\alpha i} + Nzcgi*\cos^{\alpha i};$$

$$Nxaero = fcn(Nxaeroi);$$

$$Nzaero = fcn(Nzaeroi);$$

$$CL = (Nzaero*GW*g0)/QS;$$

$$QS = fcn(\text{aero and geometrical parameters});$$

$$CDth = fcn(\text{aero parameters, tables});$$

$$FNth = CDth*0.7*ps*Mach2 + GW*g0\ Nxaero;$$

$$WFEth = fcn(\text{aero, engine parameters and tables});$$

$$CD = fcn(\text{aero and engine parameters});$$

$$DP = fcn(\text{aero parameters}),$$

in which:
αi: corrected incidence for the ith source;
Nxaeroi: acceleration of the aircraft along the x axis in the aircraft reference frame for the ith source;
Nzaeroi: acceleration of the aircraft along the z axis in the aircraft reference frame for the ith source;
CL: lift;
CDth: theoretical drag;
FNth: theoretical thrust;
WFEth: theoretical fuel consumption;
CD: drag; and
DP: degradation in performance.

The calculation of the parameter for performance degradation (in terms of fuel consumption) preferably represents the degradation in % of the fuel consumption. This precise value allows the pilot to recalculate his fuel predictions up to the destination to the nearest few percent.

The means 22 then verify, as a function of parameters of the aircraft, such as for example the parameter N1, the inclination, the configuration, the state of the lever for the spoilers and the height, whether the degradations previously calculated are valid or not.

Under valid conditions of flight, the degradations remain equal to those calculated for the means 18. In the contrary case, the degradations are fixed at their last valid value.

Via the means 24, the values of degradations are then filtered before being made available to the display means 7. The filter used by the means 24 has a time constant which is a function of the difference between the degradation displayed at the preceding time and that calculated at the present time by the means 22, together with of the sign of this difference. This allows abrupt and one-off variations to be avoided, and a reactivity to be provided that is a function of the estimated degradation.

The information on the degradation in fuel consumption may be presented in the following manner, for example on a screen 16 of the ECAM type:

"FUEL PENALTY=+XX %", XX representing the numerical value of the degradation such as transmitted by the means 24.

Depending on the amplitude of the degradation, and on its comparison with the degradation taken into account in the calculation of the predictions on the fuel of the system 3, the means 26 decide on the activation or not of a warning via the means 9. The warning may consist for example of a message which is displayed on a page of a screen of the ECAM type, notably on the screen 16.

By virtue notably of the means 13 for re-adjustment of the incidence data with the inertial data and satellite positioning data, the present invention allows a precision to be attained in the degradations of 2% over 95% of the time where it is available. Its level of availability reaches around 80% over the climbing and cruising phases of flight.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for estimating a degradation in performance of an aircraft during flight, the method performed by a computing device comprising:
   a) acquiring, using the computing device, in real time data comprising at least air and inertial data and satellite positioning data, said air, inertial data, and satellite positioning data being solely associated with the same aircraft, wherein, in addition to step a), the following sequence of steps are carried out in an automatic and repetitive manner:
   b) readjusting, using the computing device, the air and inertial data of the same aircraft is carried out with the aid of said satellite positioning data;
   c) calculating, using the computing device, at least one numerical value of the effect of a degradation in performance of the same aircraft based on a fuel consumption parameter and a drag parameter, both said parameters related to the same aircraft, by comparing the current state of said fuel consumption and drag parameters, which are calculated starting from said re-adjusted air and inertial data with the aid of at least one performance model, with a theoretical state of said parameters; and
   d) displaying said at least one numerical value being calculated of the effect of a degradation in performance based on said parameters on at least one screen in a cockpit of the same aircraft.

2. The method as claimed in claim 1, wherein at step b), performing the readjusting step by calculating a bias of the air and inertial data representing a total slope bias and by correcting with the aid of this bias the air and inertial data which are used at step c).

3. The method as claimed in claim 1, wherein at an intermediate step between steps c) and d), verifying, according to attitude parameters of the aircraft, whether the numerical value calculated at step c) is valid or not, and if the numerical value is not valid, fixing at the last numerical value considered as valid.

4. The method as claimed in claim 1, wherein, at an intermediate step between steps c) and d), calculating a difference between the current numerical value and the value currently displayed on said screen, and comparing this difference with a first predetermined threshold, and, at step d), as value which is displayed on the screen, replacing said value currently displayed by said current numerical value, if said difference exceeds said first threshold.

5. The method as claimed in claim 1, wherein, at a step after step c), calculating a difference between the current numerical value and a value available in a flight management system, and comparing this difference with a second predetermined threshold, and generating a warning if the difference between these two values exceeds said second threshold.

6. The method as claimed in claim 1, wherein, at a step after step c), transmitting to at least one system of the aircraft said numerical value calculated at step c).

7. The method as claimed in claim 1, wherein, at step a), determining said data comprising at least air and inertial data and satellite positioning data.

8. A computing device for estimating a degradation in performance of an aircraft, said computing device comprising:
   a first means for performing an acquisition, in real time, of data comprising at least air and inertial data and satellite positioning data, said air, inertial data, and satellite positioning data being solely associated with the same aircraft;
   a second means for performing a re-adjustment of the air and inertial data of the same aircraft with the aid of said satellite positioning data;
   a third means for calculating at least one numerical value of the effect of a degradation in performance of the same aircraft based on a fuel consumption parameter and a drag parameter, both said parameters related to the same aircraft, by comparing the current state of said fuel consumption and drag parameters, which are calculated starting from said re-adjusted air and inertial data with the aid of at least one performance model, with a theoretical state of said parameters; and
   a display means for displaying, on at least one screen in a cockpit of the same aircraft, said at least one calculated numerical value of the effect of a degradation in performance on said parameters.

9. The device as claimed in claim 8, wherein said device additionally comprises means for verifying the validity of a calculated numerical value.

10. The device as claimed in claim 8, wherein said display means are formed in such a manner as to replace, on said screen, the value currently displayed by the current numerical value, if said difference exceeds a first predetermined threshold.

11. The device as claimed in claim 8, wherein said device additionally comprises means for generating a warning if the difference between the current numerical value and a value available in a flight management system exceeds a second predetermined threshold.

12. The device as claimed in claim 8, wherein said device additionally comprises means for determining said data comprising at least air and inertial data and satellite positioning data.

13. An aircraft comprising:
- a computing device for estimating a degradation in performance of an aircraft, said computing device comprising:
  - a first means for performing an acquisition, in real time, of data comprising at least air and inertial data and satellite positioning data, said air, inertial data, and satellite positioning data being solely associated with the same aircraft;
  - a second means for performing a re-adjustment of the air and inertial data of the same aircraft with the aid of said satellite positioning data;
  - a third means for calculating at least one numerical value of the effect of a degradation in performance of the same aircraft based on a fuel consumption parameter and a drag parameter, both said parameters related to the same aircraft, by comparing the current state of said fuel consumption and drag parameters, which are calculated starting from said re-adjusted air and inertial data with the aid of at least one performance model, with a theoretical state of said parameters; and
  - a display means for displaying, on at least one screen in a cockpit of the same aircraft, said at least one calculated numerical value of the effect of a degradation in performance on said parameters.

* * * * *